United States Patent [19]

Goto et al.

[11] Patent Number: 4,829,175
[45] Date of Patent: May 9, 1989

[54] LIGHT BEAM SCANNING APPARATUS, METHOD OF CORRECTING UNEVENNESS IN SCANNING LINES IN LIGHT BEAM SCANNING APPARATUS, METHOD OF DETECTING DEFLECTION OF ROTATIONAL AXIS OF LIGHT BEAM DEFLECTOR AND ROTATIONAL AXIS DEFLECTION DETECTING DEVICE

[75] Inventors: Chiaki Goto; Kazuo Horikawa, both of Kanagawa, Japan

[73] Assignee: Fuji Photo Film Co., Ltd., Kanagawa, Japan

[21] Appl. No.: 938,298

[22] Filed: Dec. 5, 1986

[30] Foreign Application Priority Data

Dec. 5, 1985 [JP] Japan ................................. 60-272399
Feb. 7, 1986 [JP] Japan ................................. 61-23950
Feb. 10, 1986 [JP] Japan ................................. 62-25938

[51] Int. Cl.⁴ .............................................. H01J 3/14
[52] U.S. Cl. ................................... 250/236; 350/6.8
[58] Field of Search ............................... 250/234–236; 350/6.7, 6.8, 486; 358/206, 208, 293

[56] References Cited

U.S. PATENT DOCUMENTS 3,885,857 5/1975 Flogaus et al. ...................... 250/235
4,067,021 1/1978 Baylis et al. ........................... 350/6.7

FOREIGN PATENT DOCUMENTS 54-58035 10/1979 Japan ................................. 250/6.7
54-114935 4/1981 Japan ................................. 250/6.7

Primary Examiner—Edward P. Westin
Assistant Examiner—Khaled Shami
Attorney, Agent, or Firm—Sughrue, Mion, Zinn, Macpeak, and Seas

[57] ABSTRACT

A method of correcting unevenness in scanning lines in a light beam scanning apparatus having a mechanical scanning light beam deflector which rotates about a rotational axis to deflect a scanning light beam in a main scanning direction and a correcting light beam deflector for deflecting the scanning light beam in a sub-scanning direction, comprising steps of continuously detecting deflection of the rotational axis of the scanning light beam deflector to obtain nonperiodic deviation of the scanning light beam in the sub-scanning direction, storing the difference between a position of the scanning light beam detected at a starting point immediately before the effective scanning range and the nonperiodic deviation of the scanning light beam as a starting point deviation, storing the difference between a position of the scanning light beam detected at an end point immediately behind the effective scanning range and the nonperiodic deviation of the scanning light beam as an end point deviation, successively calculating deviation of the scanning light beam from a target scanning position in the middle of straight scanning on the basis of the stored starting point deviation, the stored end point deviation and the rotating angle of the scanning light beam deflector as periodic deviation, and determining the amount by which the scanning light beam is to be deflected in the sub-scanning direction by the correcting light beam deflector on the basis of the sum of the nonperiodic deviation and the periodic deviation.

35 Claims, 9 Drawing Sheets

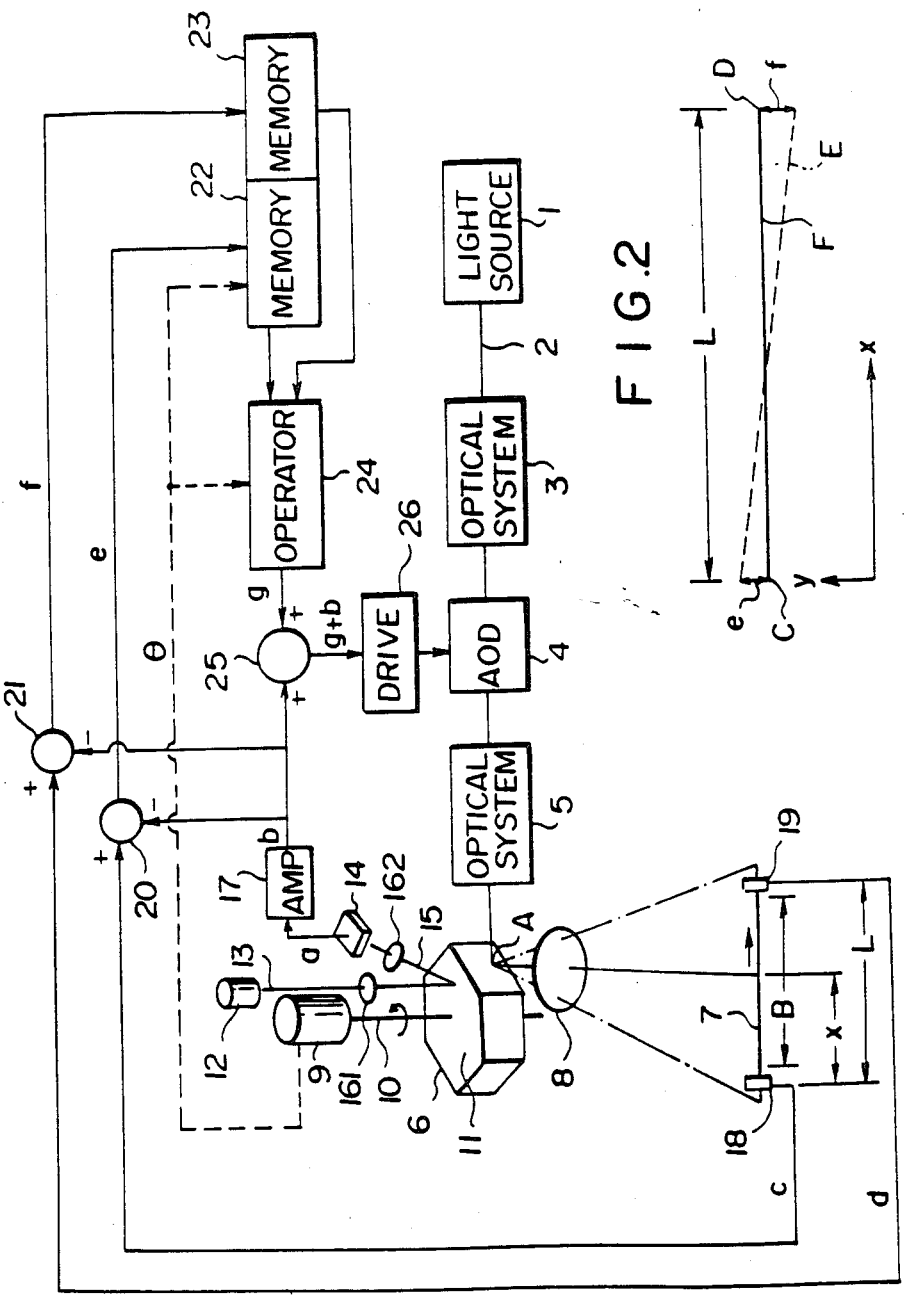

LIGHT BEAM SCANNING APPARATUS, METHOD OF CORRECTING UNEVENNESS IN SCANNING LINES IN LIGHT BEAM SCANNING APPARATUS, METHOD OF DETECTING DEFLECTION OF ROTATIONAL AXIS OF LIGHT BEAM DEFLECTOR AND ROTATIONAL AXIS DEFLECTION DETECTING DEVICE

BACKGROUND OF THE INVENTION

1. Field of the Invention

This invention relates to a light beam scanning apparatus and a method of correcting unevenness in the scanning lines in the sub-scanning direction in a light beam scanning apparatus having a mechanical light deflector such as a rotating polygonal mirror rotating about a rotational axis.

2. Description of the Prior Art

A mechanical light deflector such as a rotating polygonal mirror, a galvanometer mirror, a bimorph mirror or a hologram scanner rotating about a rotational axis has been employed in a light beam scanning apparatus for scanning a recording medium with a light beam in order to record information on the recording medium or to read out information recorded thereon. In the light beam scanning apparatus the scanning lines are deviated in the direction of the subscanning direction due to periodic change in the inclination of the deflecting surface and/or nonperiodic change of he deflecting surface generated by deflection of the rotational axis, thereby causing unevenness in the scanning lines. Unevenness in the scanning lines lowers accuracy in writing information and/or accuracy in reading information.

It has been proposed to prevent the periodic and nonperiodic unevenness in the scanning lines by use of various special optical systems. For example, in Japanese Unexamined Patent Publication No. 54(1979)-69450, it is proposed to lower the angular magnification by use of a diffraction grating. In Japanese Unexamined Patent Publication Nos. 57(1982)-20715, 57(1982)-210315 and 51(1976)-6563, and United States Patent No. 3,897,132, it is proposed to oppose a pair of reflecting mirrors combined to extend perpendicular to each other and to form an edge perpendicular to the rotational axis of the rotating polygonal mirror against the reflecting surface of the polygonal mirror so that the light beam is once reciprocated between the rotating polygonal mirror and the pair of reflecting mirrors. In Japanese Unexamined Patent Publication No. 58(1983)-93021, it is proposed to insert an fθ lens system consisting of two groups including a cylindrical lens between a rotating polygonal mirror and a surface to be scanned.

In the former two cases, there is a problem that a correcting optical system must be inserted between the rotating polygonal mirror and the convergent lens (fθ lens) to elongate the optical path between the polygonal mirror and the convergent lens, thereby enlarging the convergent lens and the overall scanning apparatus. In the last case in which an fθ lens system including a cylindrical lens is employed, it is difficult to adjust lenses and the lens system on the side of the surface-to-be-scanned is substantially enlarged.

There also has been known a method of preventing unevenness in the scanning lines by use of a correcting deflector without use of a special optical system. For example, in the system disclosed in Japanese Unexamined Patent Publication Nos. 53(1978)-146443 and 55(1980)-15197, deviation of the scanning lines in the sub-scanning direction is detected before the scanning starting point and the correcting amount of the correcting deflector is determined on the basis of the detected deviation. In the system disclosed in Japanese Unexamined Patent Publication No. 57(1982)-150817, correction amounts corresponding to the respective reflecting surfaces of the rotating polygonal mirrors are detected in advance and stored, and the correcting deflector corrects the scanning line on the basis of the correction amount read out corresponding to the reflecting surface actually deflecting the light beam. However, though either of the former and latter systems can compensate for the periodical unevenness in the scanning lines, neither of the systems can compensate for the nonperiodic unevenness of the scanning lines.

SUMMARY OF THE INVENTION

In view of the foregoing observations and description, the primary object of the present invention is to provide a method of correcting unevenness in the scanning lines in a light beam scanning apparatus having a mechanical light deflector which can substantially perfectly compensate for both the periodic and nonperiodic unevenness in the scanning lines so that the scanning lines are arranged in parallel to each other and to be equidistant from each other, whereby information can be written and read out with a high accuracy.

Another object of the present invention is to provide a light beam scanning apparatus in which unevenness in the scanning lines is corrected by the method of the present invention.

Still another object of the present invention is to provide a method of and a device for detecting deflection of the rotational axis of a mechanical light beam deflector in a light beam scanning apparatus.

In one aspect of the present invention, there is provided a method of correcting unevenness in scanning lines in a light beam scanning apparatus having a mechanical scanning light beam deflector which rotates (in this specification, the term "rotate" as for the deflector should be broadly interpreted to include both "to make complete rotations" and "to swing back and forth by a certain angle") about a rotational axis to deflect a scanning light beam in a main scanning direction and a correcting light beam deflector for deflecting the scanning light beam in a subscanning direction, comprising steps of continuously detecting deflection of the rotational axis of the scanning light beam deflector to obtain nonperiodic deviation of the scanning light beam in the sub-scanning direction, storing the difference between a position of the scanning light beam detected at a starting point immediately before the effective scanning range and the nonperiodic deviation of the scanning light beam as a starting point deviation, storing the difference between a position of the scanning light beam detected at an end point immediately behind the effective scanning range and the nonperiodic deviation of the scanning light beam as an end point deviation, successively calculating deviation of the scanning light beam from a target scanning position in the middle of straight scanning on the basis of the stored starting point deviation, the stored end point deviation and the rotating angle of the scanning light beam defletor as periodic deviation, and determining the amount by which the scanning light beam is to be deflected in the subscanning direction by the correcting light beam deflector on the basis of the sum of the nonperiodic deviation and the periodic deviation.

In another aspect of the present invention, there is provided a light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a reflecting surface which is substantially perpendicular to the rotational axis of the scanning light beam deflector and is rotated integrally with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, an amplifier for determining the nonperiodic deviation of the scanning light beam in the sub-scanning direction through the deflection of the rotational axis, a first position sensor which is disposed at a starting point immediately before the effective scanning range to detect the position of the scanning light beam in the sub-scanning direction, a second position sensor which is disposed at an end point immediately behind the effective scanning range to detect the position of the scanning light beam in the sub-scanning direction, a first subtracter calculating the difference between the output of the first position sensor and the nonperiodic deviation, a second subtracter for calculating the difference between the output of the second position sensor and the nonperiodic deviation, a first memory for storing the output of the first subtracter as a starting point deviation, a second memory for storing the output of the second subtracter as an end point deviation, an operator for successively calculating deviation of the scanning light beam from a target scanning position in the middle of straight scanning on the basis of the stored starting point deviation, the stored end point deviation and the rotating angle of the scanning light beam deflector and outputting it as periodic deviation, an adder for calculating the sum of the periodic deviation and the nonperiodic deviation, and a driving circuit for driving the correcting light beam deflector on the basis of the sum to cancel unevenness in the scanning lines.

In the light beam scanning apparatus, a revolution surface mirror having a reflecting surface which is a surface of revolution coaxial with the scanning light beam deflector, e.g., a cylindrical mirror, a conical mirror or the like, may be used instead of said reflecting surface which is substantially perpendicular to the rotational axis of the scanning light beam deflector and is rotated integrally with the scanning light beam deflector.

In still another aspect of the present invention, there is provided a method of correcting unevenness in scanning lines in a light beam scanning apparatus having a mechanical scanning light beam deflector which rotates about a rotational axis to deflect a scanning light beam in a main scanning direction and a correcting light beam deflector for deflecting the scanning light beam in a sub-scanning direction, comprising steps of storing in advance the periodic deviation of the scanning light beam in the sub-scanning direction in connection with the rotating angle of the scanning light beam deflector for each deflecting surface thereof, storing in advance the periodic deflection of the rotational axis of the scanning light beam deflector in connection with the rotating angle of the scanning light beam deflector, successively calculating nonperiodic deflection of the rotational axis on the basis of the difference between continuously detected deflection of the rotational axis and the periodic deflection of the rotational axis for the corresponding rotating angle of the scanning light beam deflector, and determining the amount by which the scanning light beam is to be deflected in the sub-scanning direction by the correcting light beam deflector on the basis of the sum of the nonperiodic deviation of the scanning light beam calculated through the nonperiodic deflection of the rotational axis and the periodic deviation stored in advance.

In still another aspect of the present invention, there is provided a light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a reflecting surface which is substantially perpendicular to the rotational axis of the scanning light beam deflector and is rotated integrally with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, a first memory in which is stored in advance the periodic deviation of the scanning light beam in the sub-scanning direction in connection with the rotating angle of the scanning light beam deflector for each deflecting surface thereof, a second memory in which is stored in advance periodic deflection of the rotational axis of the scanning light beam deflector in connection with the rotating angle of the scanning light beam deflector, a subtracter for successively calculating nonperiodic deflection of the rotational axis on the basis of the difference between continuously detected deflection of the rotational axis and the periodic deflection of the rotational axis for the corresponding rotating angle of the scanning light beam deflector, an operator for calculating the nonperiodic deviation of the scanning light beam on the basis of the nonperiodic deflection of the rotational axis, an adder for calculating the sum of the periodic deviation stored in the first memory and the nonperiodic deviation, and a driving circuit for driving the correcting light beam deflector on the basis of the sum to cancel unevenness in the scanning lines.

In the light beam scanning apparatus, a revolution surface mirror having a reflecting surface which is a surface of revolution coaxial with the scanning light beam deflector, e.g., a cylindrical mirror, a conical mirror or the like, may be used instead of said reflecting surface which is substantially perpendicular to the rotational axis of the scanning light beam deflector and is rotated integrally with the scanning light beam deflector.

In still another aspect of the present invention, there is provided a method of detecting deflection of a rotational axis of a mechanical light beam deflector which rotates about the rotational axis to deflect a scanning light beam in a light beam scaning apparatus, comprising steps of providing a revolution surface mirror having a reflecting surface which is a surface of revolution coaxial with the light beam deflector, emitting a detection light beam spreading at least in the longitudinal direction of the rotational axis to be reflected by the reflecting surface, focusing the reflected detection light beam on a detecting surface having a position sensor detecting the deflection of the rotational axis on the basis of the component of the deviation of the focused light beam on the detecting surface parallel to the deflecting point-rotational axis plane.

In still another aspect of the present invention, there is provided a rotational axis deflection detector for detecting deflection of a rotational axis of a mechanical light beam deflector which rotates about the rotational axis to deflect a scanning light beam in a light beam scanning apparatus, comprising a revolution surface mirror having a reflecting surface which is a surface of revolution coaxial with the light beam deflector, a detection light beam source for emitting a detection light beam, a first optical system for causing the detection light beam to impinge upon the reflecting surface of the revolution surface mirror in the form of a light beam spreading at least in the longitudinal direction of the rotational axis, a second optical system for focusing the detection light beam reflected by the reflecting surface on a detecting surface as a focused light beam and a position sensor for detecting the component of the deviation of the focused light beam on the detecting surface parallel to the deflecting point-rotational axis plane.

BRIEF DESCRIPTION OF THE DRAWINGS

FIG. 1 is a schematic view showing a light beam scanning apparatus in accordance with an embodiment of the present invention, FIG. 2 is a view for illustrating the principle of operation of the light beam scanning apparatus.

DESCRIPTION OF THE PREFERRED EMBODIMENTS

Figure 3:
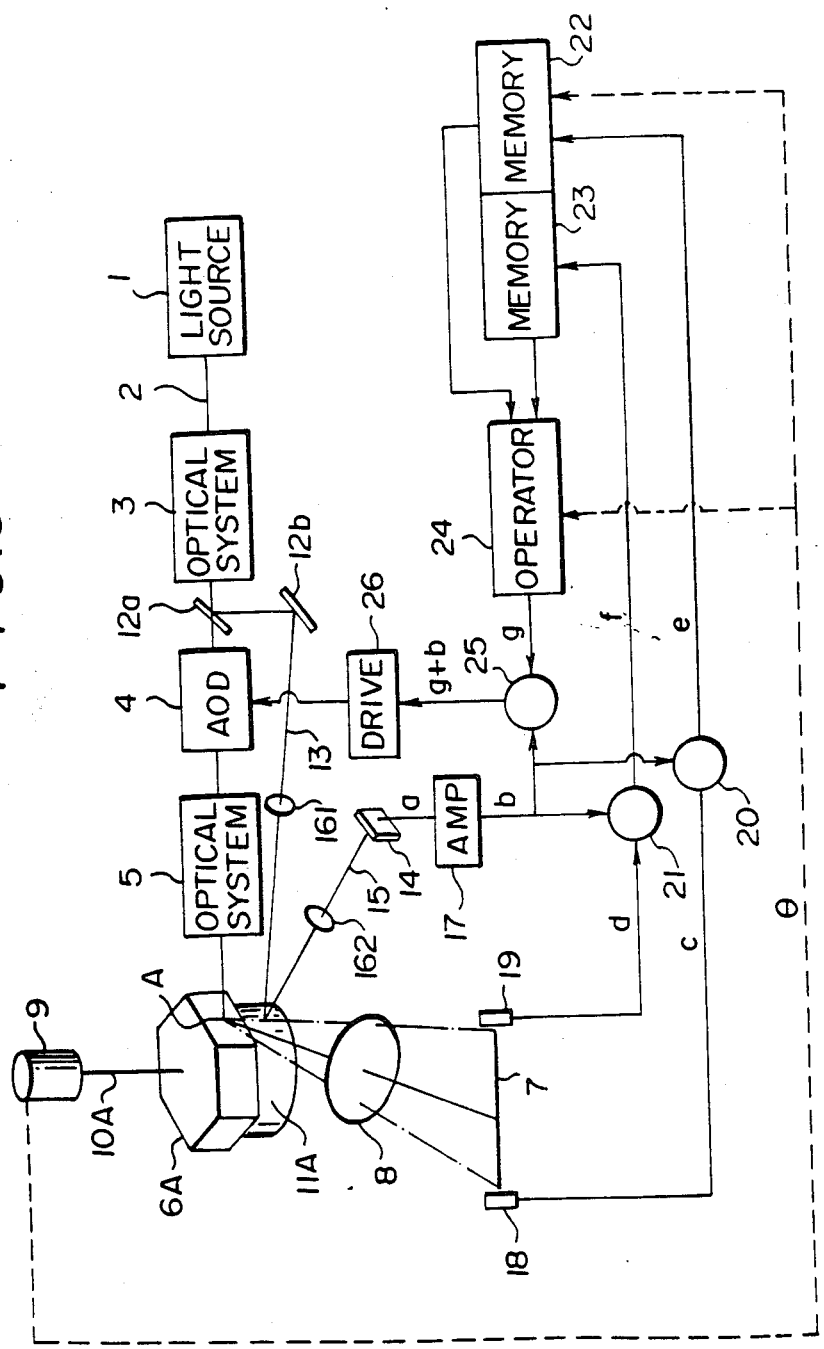
FIG. 3 is a schematic view showing a light beam scanning apparatus in accordance with another embodiment of the present invention.

In FIG. 1, a scanning light beam 2 emitted from a light source 2, e.g., a laser, enters a correcting light beam deflector 4 by way of an optical system 3. As the correcting light beam deflector 4, an ultrasonic light beam deflector (acoustooptic modulator, AOD) or the like may be used when the scanning light beam 2 emitted from the light source has a fixed wavelength like a laser beam, and a galvanometer mirror or the like may be used when the scanning light beam 2 has various wavelength components. The scanning light beam 2 deflected by the correcting light beam deflector 4 travels through an optical system 5 and impinges upon a scanning light beam deflector which is a rotating polygonal mirror 6 in this particular embodiment. The scanning light beam 2 is deflected by the polygonal mirror 6 to scan a surface-to-be-scanned in response to rotation of the polygonal mirror 6 about a rotational axis 10. Reference numeral 7 denotes a scanning line formed by the scanning light beam 2. Between the surface-to-be-scanned and the polygonal mirror 6 is disposed an $f\theta$ lens 8, and the polygonal mirror 6 is driven by an electric motor 9.

An end face (the upper end face in this particular embodiment) of the polygonal mirror 6 forms a reflecting surface 11 perpendicular to the rotational axis 10 of the polygonal mirror 6. A detection light beam 13 emitted from a detection light beam source 12 impinges upon the reflecting surface 11 to be reflected thereby to enter a rotational axis deflection detector 14. The rotational axis deflection detector 14 detects deviation of a reflected light 15 and may comprise a semiconductor position sensitive detector (PSD). The PSD comprises a silicon plate bearing P-type and N-type resistance layers on opposite sides thereof. When a light beam impinges upon the PSD in a spot-like manner, carrier electrons are generated and a photoelectric current flows between a pair of electrodes on opposite edges. The photoelectric current differs depending on the distances between the incident position at which the light beam impinges upon the PSD and the respective electrodes, and accordingly, the incident position can be known by way of the photoelectric current. Further, the detector 14 may comprise a photosensor, photodiode array, image sensor, vidicon or the like.

The detection light beam 13 emitted from the detection light beam source 12 is converted, by a suitable optical system 161 before impinging upon the reflecting surface 11, into a light beam spreading in the direction of a line perpendicular to the rotational axis 10 and passing through the deflection point A on the polygonal mirror 6 at which the scanning light beam 2 impinges upon the polygonal mirror 6 to be deflected to scan the surface-to-be-scanned. The detection light beam 13 reflected by the reflecting surface 11, i.e., the reflected light 15 is focused on the detecting surface of the rotational axis deflection detector 14 by a suitable optical system 162. Of deviations of the reflected light 15 focused on the detecting surface, the deviation in the direction of an orthogonal projection of the line perpendicular to the rotational axis 10 and passing through the deflection point A onto the detecting surface is detected by the deflection detector 14. It is preferred that the detection light beam 13 be emanated so that the reflecting point on the reflecting surface 11 at which the detection light beam 13 is reflected is positioned in the plane including the rotational axis 10 and the deflection point A. With this arrangement, the reflecting point on the reflecting surface 11 approaches the deflection point A and accordingly accuracy in detecting the deflection of the rotation axis 10 is improved. However, theoretically, the detection light beam 13 may be reflected at any point of the reflecting surface 11.

The rotational axis deflection detector 14 employed in this embodiment is particularly suitable when the rotating polygonal mirror 6 is fixed to the rotational shaft (axis) 10 with a high accuracy and the reflecting surface 11 is kept at 90° to the rotational axis 10 with a substantially high accuracy so that the change in the output of the rotational axis deflection detector 14 in a static state is negligible and the degree of arcuate deformation of the scanning lines is relatively small. That is, the deflection of the rotational axis 10 detected by the rotational axis deflection detector 14 in this embodiment includes only the nonperiodic component.

An amplifier 17 determines a nonperiodic deviation b of the scanning light beam 2 with respect to the scanning line 7 by way of the deflection a of the rotational axis 10.

Position sensors 18 and 19 for detecting the position of the scanning light beam 2 are respectively disposed on a starting point immediately before the effective scanning range B and on an end point immediately behind the same. Similarly to the rotational axis deflection detector 14, the positions sensors 18 and 19 may be comprised of a semiconductor position sensitive detector, for instance. Output signals of the position sensors 18 and 19, i.e., position signals c and d representing the position of the scanning light beam 2 include the nonperiodic deviation b or the deviation due to nonperiodic deflection of the rotational axis 10.

A subtracter 20 subtracts the nonperiodic deviation b from the position signal c to obtain a periodic starting point deviation e, and subtracts the nonperiodic deviation b from the position signal d to obtain a periodic end point deviation f.

the periodic starting point deviation e and the periodic end point deviation f for each deflecting surface of the rotating polygonal mirror 6 are respectively stored in memories 22 and 23.

An operator 24 reads out the starting point deviation e and the end point deviation f stored one cycle before for each deflecting surface of the rotating polygonal mirror 6, and calculates the deviation from a target scanning position in the middle of scanning in the case of linear scanning, i.e., periodic deviation g, in synchronization with the rotating polygonal mirror 6. The operator 24 may be either an analog operator or a digital operator.

The operation of the operator 24 will be described in more detailed with reference to FIG. 2, hereinbelow.

In FIG. 2, point C represents a position in which the starting point deviation e is zero, and point D represents a position in which the end point deviation f is zero. There are assumed an x-axis and y-axis as shwon in FIG. 2. Since the scanning line may be considered to be linear in this embodiment, a scanning line as represented by a dotted straight line E in FIG. 2 can be supposed when the starting point deviation is e and the end point deviation is f. That is, when the point C is assumed to be the origin, the supposed scanning line E can be represented by the following formula.

$$y = [(f-e)/L] \cdot x + e \quad (1)$$

where L represents the distance between the points C and D, and x represents the position of the scanning point. the target scanning line can be considered to be a straight line having an inclination of O and passing through the origin C, i.e., a straight line on the x-axis shown by the solid line F in FIG. 2. The correction amount required to correct the supposed scanning line E to the target scanning line F is given as y in formula (1). More particularly, the y represents the correction amount required when no deflection of the rotational axis exists. The operator 24 successively calculates the correction amount y as a periodic deviation g and outputs it in synchronization with rotational angle $\theta$.

An adder 25 calculates the sum of the periodic deviation g thus obtained and the nonperiodic deviation b, the sum (g+b) representing the correction amount required when a deflection of the rotational axis exists.

A driving circuit 26 drives the correcting light beam deflector 4 on the basis of the sum of the periodic deviation g and the nonperiodic deviation b to avoid unevenness in the scanning lines. When an AOD is used as the correcting light beam deflector 4, the driving circuit 26 may comprise a voltage control oscillator (VCO), for instance.

As described above, in accordance with this embodiment, the correctying light beam deflector 4 is driven to avoid unevenness in the scanning lines on the basis of the sum (g+b) of the periodic deviation g of each scanning point from the target scanning line F and the nonperiodic deviation b.

FIG. 3 shows a light beam scanning apparatus in accordance with another embodiment of the present invention. The light beam scanning apparatus of this embodiment is very similar to that shown in FIG. 1, and accordingly, only the difference therebetween will be mainly described hereinbelow, and the parts analogous to the parts shown in FIG. 1 are given the same reference numerals and will not be described here. In the embodiment shown in FIG. 3, a cylindrical mirror 11A having a reflecting surface on the peripheral surface is employed instead of the reflecting surface 11 in the embodiment shown in FIG. 1. The cylindrical mirror 11A is formed integrally with the rotating polygonal mirror 6A to be coaxial therewith. That is, the cylindrical mirror 11A is formed by machining a part of the rotating polygonal mirror 6A. The cylindrical mirror 11A is mounted with such a high accuracy that the periodic deflection of the rotational axis is negligible.

In this embodiment, the detection light beam 13 is divided from the scanning light beam 2 emitted from the light source 1 by a half-silvered mirror 12a and is reflected by a reflecting mirror 12b to impinge upon the cylindrical mirror 11A.

In this embodiment, the deflection of the rotational axis is detected in the following manner.

The detection light beam 13 is converted, by a suitable optical system 161, into a light beam spreading at least in the direction of the rotational axis 10A before impinging upon the cylindrical mirror 11A. The detection light beam 13 after reflected by the cylindrical mirror 11A, i.e., reflected light beam 15, is focused by a suitable optical system 162 on the detecting surface of the rotational axis deflection detector 14 which may comprise a semiconductor position sensitive detector.

The deviation of the focused detection light beam in the direction parallel to the plane including the deflection point A and the rotational axis 10A (to be referred to as "deflection point-rotational axis plane", hereinbelow) is detected by the rotational axis deflection detector 14. It is preferred that the reflecting point on the cylindrical mirror 11A at which the detection light beam 13 is reflected be on the intersection of the deflection point-rotational axis plane and the peripheral surface of the cylindrical mirror 11A. This is because, with this arrangement, the direction in which the detection light beam 13 is reflected is most changed with respect to the component of the deflection of the deflecting surface including the deflecting point A in a direction parallel to the deflection point-rotational axis plane, which component most affects the deviation of the scanning light beam 2 in the sub-scanning direction.

When the rotational axis 10A of the rotating polygonal mirror 6A is deflected and the deflecting surface including the deflecting point A is inclined by an angle o with respect to the reflecting point-rotational axis plane, the scanning light beam 2 reflected at the deflecting point A is deviated by an amount corresponding to double the angle $\alpha$ in the sub-scanning direction. At this time, the detection light beam reflecting point on the cylindrical mirror 11A at which the detection light beam 13 is reflected is also inclined by an angle $\alpha$ in a plane parallel to the deflecting point-rotational axis plane and accordingly the detection light beam is deviated by an amount corresponding to double the angle $\alpha$ in the plane. The deviation of the detection light beam 13 is detected by the rotational axis deflection detector 14. That is, the deflection of the rotational axis 10A in the deflecting point-rotational axis plane can be detected through change of the output of the detector 14.

In the embodiment shown in FIG. 3, as the revolution surface mirror for reflecting the detection light beam 13, the cylindrical mirror 11A is used. However, the revolution surface mirror need not be limited to the cylindrical mirror but may be of any shape so long as it has a reflecting surface which is a surface of revolution coaxial with the scanning light beam deflector. For example, a conical mirror may be used. Further, though in the embodiment shown in FIG. 3, the revolution surface mirror has the reflecting surface for reflecting the detection light beam on the outer peripheral surface, the revolution surface mirror may have the reflecting surface on the inner peripheral surface.

Further, though in the embodiment shown in FIG. 3, the cylindrical mirror 11A is integral with the rotating polygonal mirror 6A, the cylindrical mirror 11A may be integral with the rotational shaft 10A or may be integral with both the rotational shaft 10A and the polygonal mirror 6A. That is, the revolution surface mirror for reflecting the detection light beam 13 is disposed in any position so long as its reflecting surface is a surface of revolution coaxial with the scanning light beam deflector.

The embodiments shown in FIGS. 1 and 3 are effective when the reflecting surface 11 is precisely perpendicular to the rotational axis 10 or the cylindrical mirror 11A is precisely coaxial with the polygonal mirror 6A and the periodic deflection of the rotational axis is negligible. However, when there is an error in the mounting of the reflecting surface 11 or the cylindrical mirror 11A, or when there is an error in the flatness of the reflecting surface 11 or in the curvature of the cylindrical mirror 11A, a periodic component of the deflection of the rotational axis is produced which the embodiments shown in FIGS. 1 and 3 cannot attend to.

Figure 4:
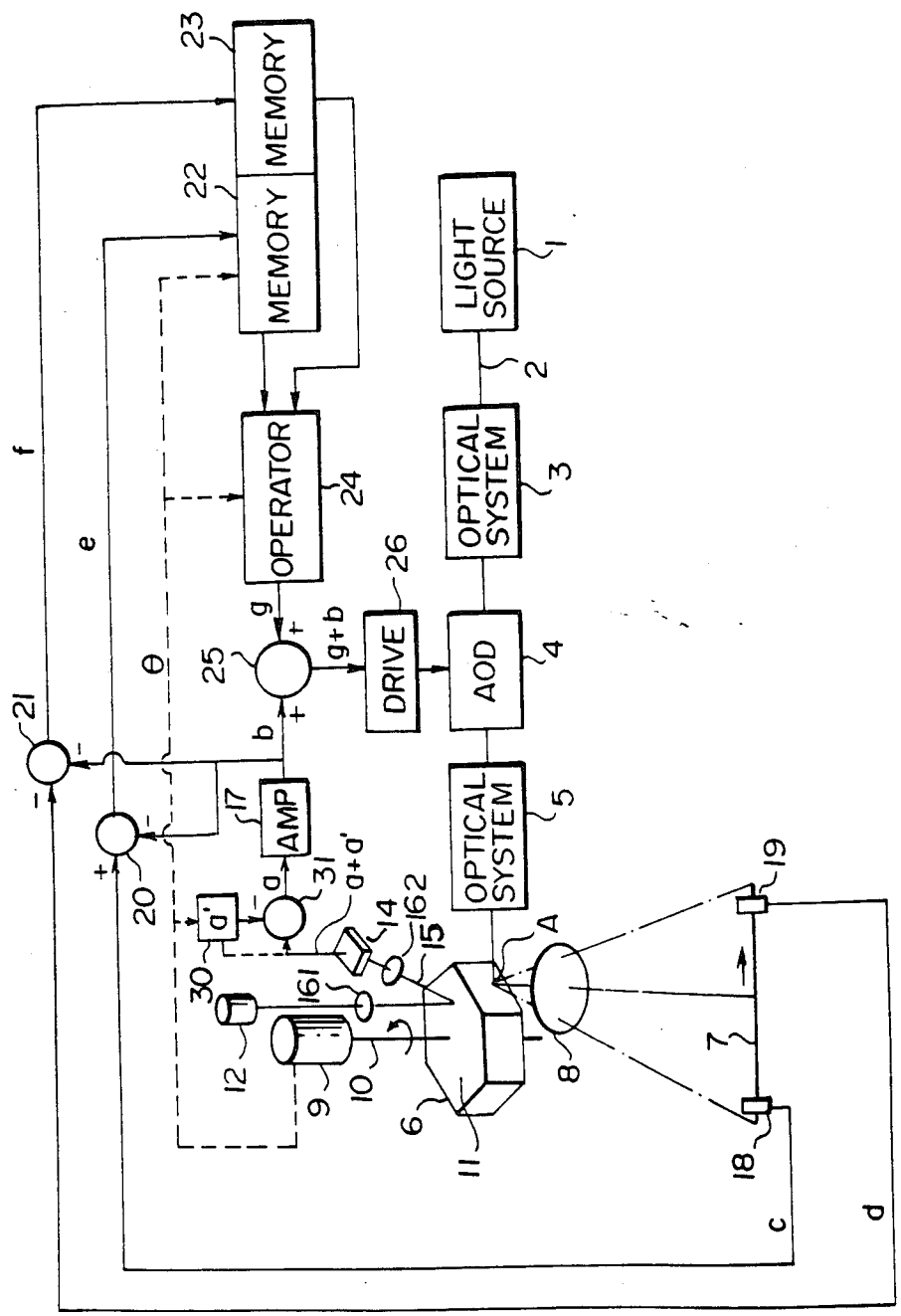
FIG. 4 is a schematic view showing a light beam scanning apparatus in accordance with still another embodiment of the present invention.

The embodiment shown in FIG. 4 can attend to such a periodic component of the deflection of the rotational axis. In this embodiment, the output of the rotational axis deflection detector 14 includes both the nonperiodic deflection a and the periodic deflection a' of the rotational axis. In FIG. 4, reference numeral 30 denotes an auxiliary memory in which is stored the periodic deflection a' detected by gently rotating the rotating polygonal mirror 6 prior to scanning. A subtracter 31 subtracts the periodic deflection a' stored in the auxiliary memory 30 from the detected deflection (a+a') to obtain the nonperiodic deflection a. The other parts shown in FIG. 4 are substantially the same as those shown in FIG. 1 or 3.

Figure 5:
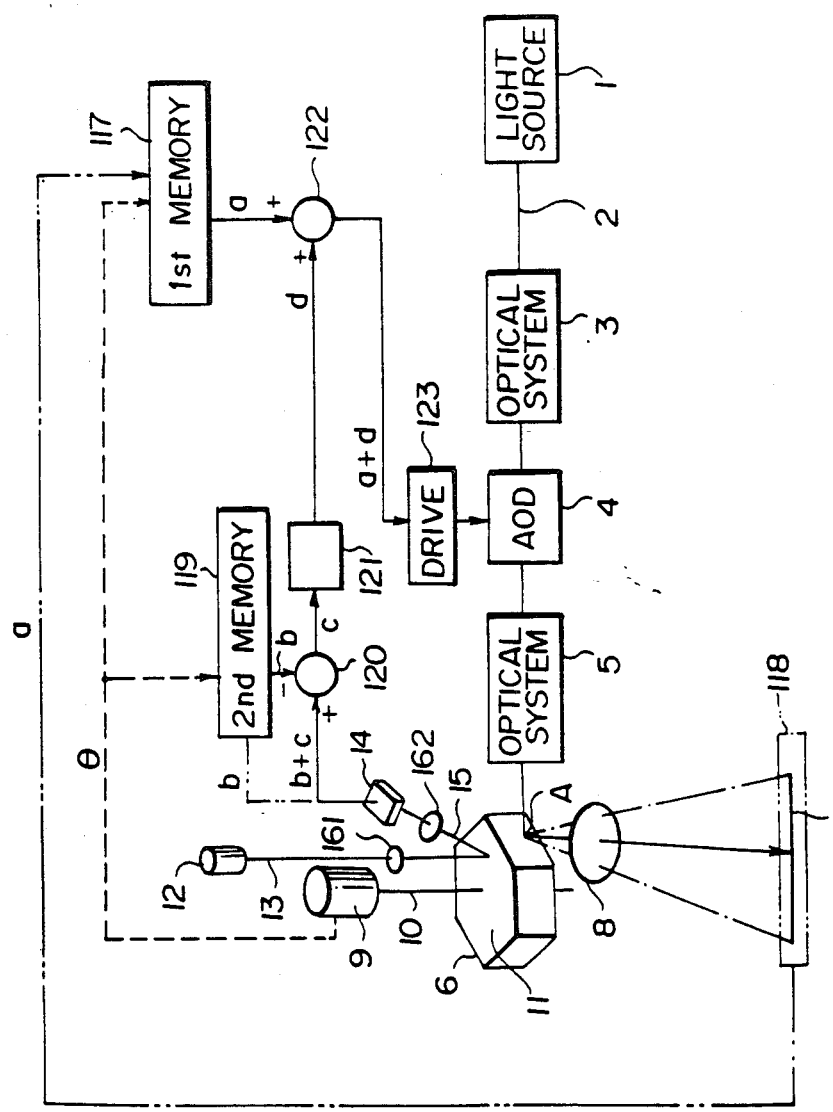
FIG. 5 is a schematic view showing a light beam scanning apparatus in accordance with still another embodiment of the present invention.

FIG. 5 shows still another embodiment of the present invention. The light beam scanning apparatus of this embodiment is mechanically very similar to that shown in FIG. 1, and accordingly, only the difference therebetween will be mainly described hereinbelow, and the parts analogous to the parts shown in FIG. 1 are given the same reference numerals and will not be described here.

A first memory 117 stores the periodic deviation of the scanning beam 2 in the sub-scanning direction in connection with the rotating angle $\theta$ of the polygonal mirror 6 for each deflecting surface of the polygonal mirror 6. That is, a position sensor 118 is disposed on the surface-to-be-scanned and the polygonal mirror 6 is gently rotated to make one revolution, and the deviation of the scanning light beam 2 at that time is stored in the first memory 117 as a function of the rotating angle $\theta$ of the polygonal mirror 6 for each deflecting surface. Thus, the periodic unevenness in the scanning lines or the periodic deviation a due to variation in the manufacturing accuracy of the deflecting surfaces, error in fixing the rotating polygonal mirror 6 to the rotational axis 10 and the like is stored in the first memory 117. The position sensor 118 is removed after the periodic deviation a is input into the first memory 117.

A second memory 119 stores the periodic deflection b of the rotational axis 10 of the rotating polygonal mirror 6 in connection with the rotating angle $\theta$ of the polygonal mirror 6. When the accuracy in flatness of the reflecting surface 11 is poor, or when the reflecting surface 11 is not precisely perpendicular to the rotational axis 10, for instance, the output of the rotational axis deflection detector 14 fluctuates periodically. The second memory 119 is for storing in advance the periodic deflection b and the periodic deflection b is input into the second memory 119 by gently rotating the polygonal mirror 6 to make one revolution prior to actual scanning.

Generally, when the polygonal mirror 6 is driven by the motor 9 for scanning, deflection of the rotational axis 10 occurs. In the deflection is included, in addition to the periodic deflection, nonperiodic deflection which is nonperiodically generated due to slight play in the bearing. A subtracter 120 subtracts the periodic deflection b read out from the first memory 119 from the deflection (b+c) continuously detected by the rotational axis deflection detector 14, thereby obtaining the nonperiodic deflection d.

An operator 121 calculates nonperiodic deviation d of the scanning light beam 2 with respect to the scanning line through the nonperiodic deflection c. AAn adder 122 calculates the sum (a+d) of the periodic deviation a successively read out from the first memory 117 and the nonperiodic deviation d represented by the output of the operator 121.

A driving circuit 123 drives the correcting light beam deflector 4 to avoid unevenness i the scanning lines on the basis of the sum (a+d). The sum (a+d) represents the deviation from the target or optimal scanning line 7 and accordingly by correcting the scanning light beam 2 by an amount corresponding to the sum (a+d), unevenness in the scnning lines can be avoided. The driving circuit 123 may comprise a voltage control oscillator which changes the driving frequency of the AOD, for instance.

The operation of the apparatus shown in FIG. 5 will be described, hereinbelow.

The position sensor 118 is positioned in place of the actual surface-to-be-scanned and the polygonal mirror 6 is gently rotated by one revolution. The periodic deviations a of the scanning light beam 2 detected by the position sensor 118 are stored in the first memory 117 in connection with the rotating angle $\theta$ of the motor 9. Further, the periodic deflections b of the rotational axis detected by the rotational axis deflection detector 14 are stored in the second memory 119 in connection with the rotating angle 8. For example, when digital memories are used as the first and second memories 117 and 119, digital signals representing the periodic deviation a and the periodic deflection b are stored in the first and second memories 117 and 119 at addresses respectively determined depending on the rotating angle $\theta$.

The periodic deviation a and the periodic deflection b are thus stored in the first and second memories 117 and 119, the surface-to-be-scanned is placed in place of the position sensor 118. When the motor 9 is subsequently energized, the subtracter 120 reads out the periodic deflection b corresponding to the rotating angle 8 and outputs the difference between the periodic deflection b and the output of the rotational axis deflection detector 14 (b+c), i.e., the nonperiodic deflection c. The nonperiodic deflection c is converted by the operator 121 into the deviation on the surface-to-be-scanned or the nonperiodic deviation d of the scanning light beam 2. The nonperiodic deviation d is added to the periodic deviation a read out from the first memory 117 by the adder 122 and the total deviation (a+d) is output from the adder 122. The driving circuit 123 drives the AOD 4 to deflect the scanning light beam 2 by an amount corresponding to the total deviation (a+d), thereby avoiding unevenness in the scanning light beams.

Though in the embodiment shown in FIG. 5, the reflecting surface 11 is used in order to detect deflection of the rotational axis, a cylindrical mirror as employed in the embodiment shown in FIG. 3 may be used instead of the reflecting surface 11 in the embodiment shown in FIG. 3.

Several examples of the rotational axis deflection detector which can be used for correction of unevenness in the scanning lines in a light beam scanning apparatus will be described with reference to FIGS. 6 to 14, hereinbelow.

Figure 6:
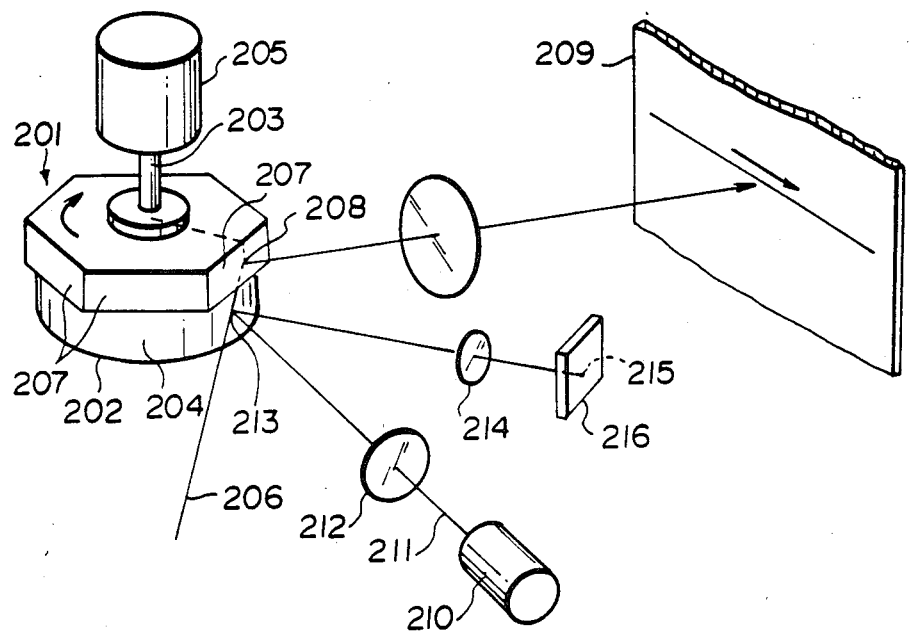
FIG. 6 is a schematic perspective view for illustrating in more detail the rotational axis deflection detector which can be employed in the light scanning apparatus of the present invention.

In FIG. 6, a scanning light beam 206 impinges upon a rotating polygonal mirror 201 at a deflecting point 208 on the deflecting surface 207 and is deflected to scan a surface-to-be-scanned 209 in response to rotation of the polygonal mirror 201 about a rotational shaft 203. The polygonal mirror 201 is driven by an electric motor 205. The surface-to-bescanned 209 is moved in the direction perpendicular to the scanning direction of the scanning light beam 206, that is, the sub-scanning direction. A cylindrical mirror 202 is formed integrally with the rotating polygonal mirror 201 to be coaxial therewith and has a cylindrical reflecting surface 204 on the peripheral surface thereof.

Reference numeral 210 denotes a detection light source for emitting a detection light beam which may be a semiconductor laser, gas-laser, light emitting diode, white light source or the like. Instead of separately providing the detection light source 210, the detection light beam 211 may be obtained by dividing the scanning light beam 206 by a beam splitter, for instance.

The detection light beam 211 emitted from the source 210 is converted, by a first optical system 212, into a light beam spreading at least in the direction of the rotational shaft 203 before impinging upon the cylindrical reflecting surface 204. The deflection light beam 211 impinges upon the reflecting surface 204 to be reflected at a reflecting portion 213 and is focused by a second optical system 214 to form a focused light beam 215. The focused light beam 215 is focused on a detecting surface having a position sensor 216.

The first and second optical systems 212 and 214 will be described in detail withrreference to FIGS. 7 to 14, hereinbelow.

Figure 7:
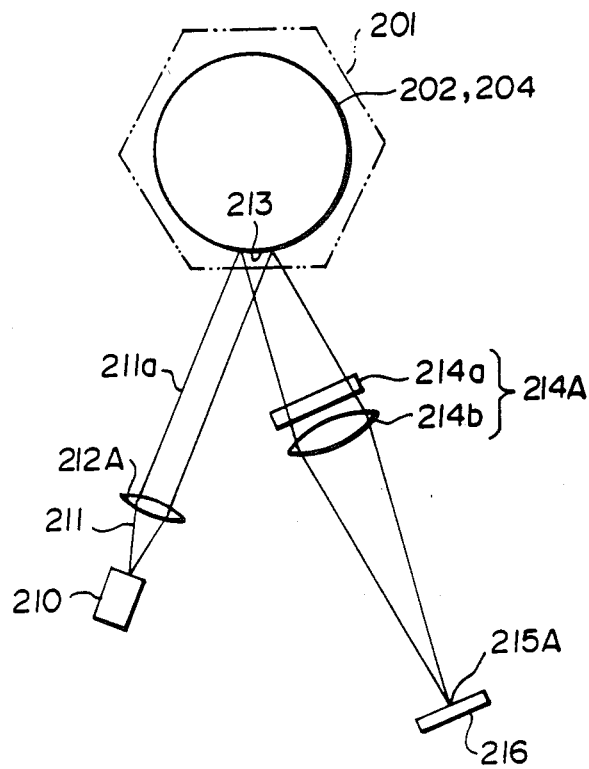
FIG. 7 is a schematic plan view showing a combination of the first and second optical systems which can be employed in the rotational axis deflection detector of the present invention.
Figure 8:
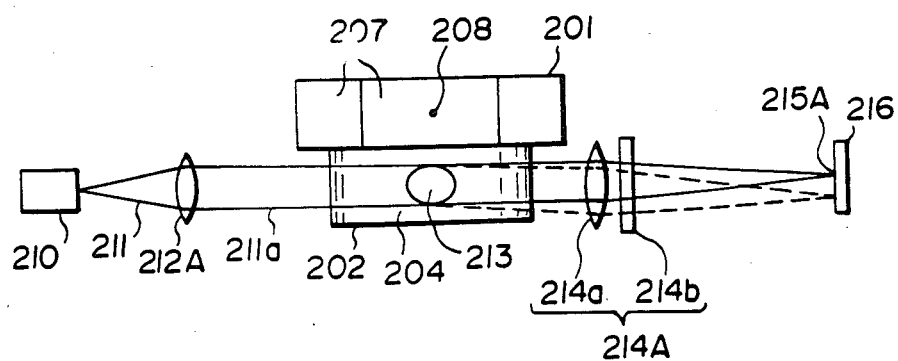
FIG. 8 is a developed side view of the optical systems shown in FIG. 7.

In the example shown in FIGS. 7 and 8, the first optical system 212A comprises a spherical lens for converting the detection light beam 211 emitted from the light source 210 into a coherent light beam 211a. The second optical system 214A comprises a pair of cylindrical lenses 214a and 214b disposed perpendicular to each other to convert the detection light beam 211 reflected by the cylindrical reflecting surface 204 into a spot-like beam 215A. In this example, the spot-like beam 215A is vertically moved as shown by the dotted line in FIG. 8 in response to the deflection component of the rotational shaft 203 in a direction parallel to the deflecting point-rotational axis plane.

Figure 9:
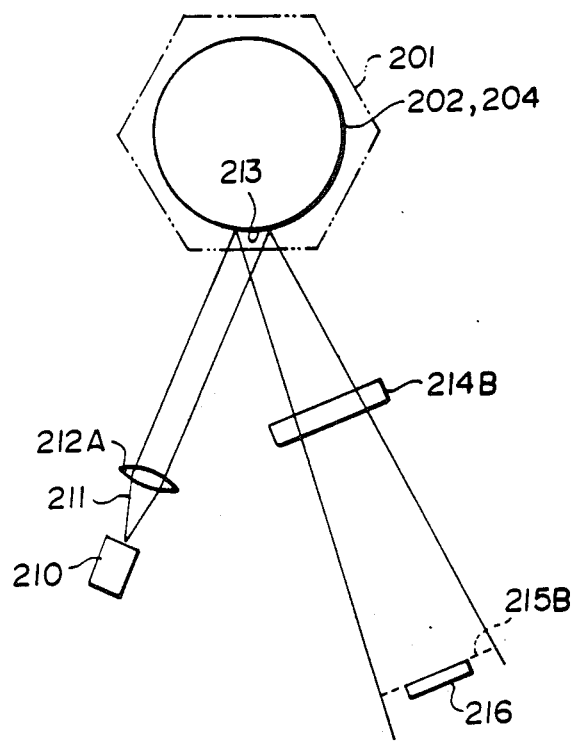
FIG. 9 is a schematic plan view showing another combination of the first and second optical systems which can be employed in the rotational axis deflection detector of the present invention.
Figure 10:
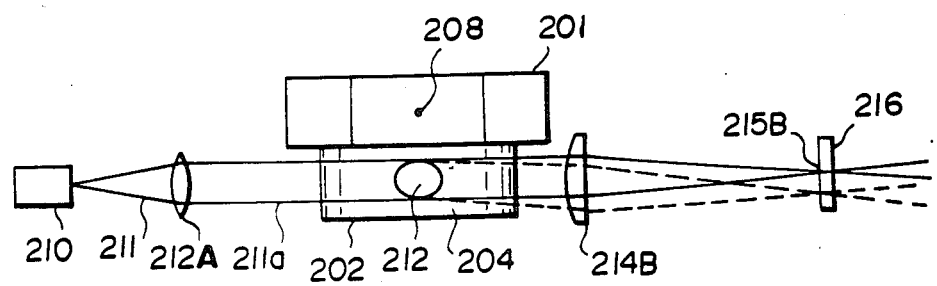
FIG. 10 is a developed side view of the optical systems shown in FIG. 9.

In the example shown in FIGS. 9 and 10, the first optical system is the same as that of the example shown in FIGS. 7 and 8, while the second optical system 214B comprises a single cylindrical lens which converts the detection light beam 211 into a strip-like beam 215B. Thus, in this example, the strip-like light beam 215B constantly extends across the position sensor 216 and deviation of the strip-like beam 215B parallel to the deflecting point-rotational axis plane is detected.

Figure 11:
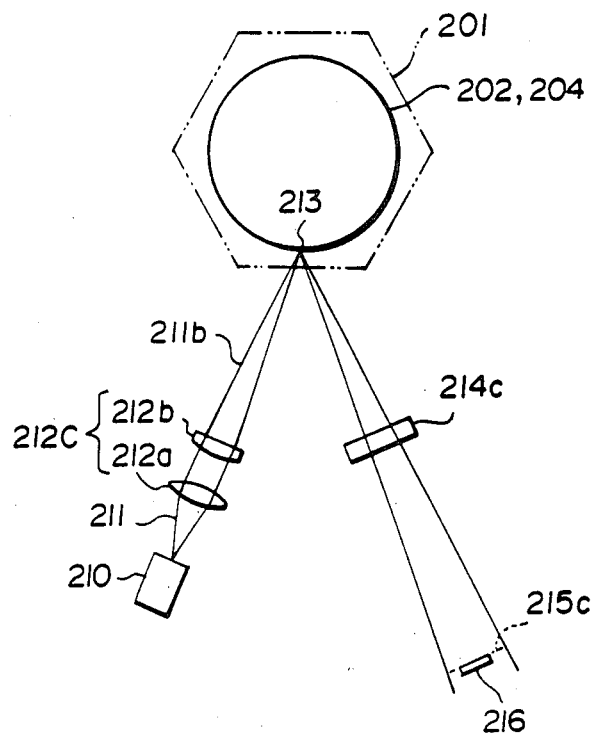
FIG. 11 is a schematic plan view showing still another combination of the first and second optical systems which can be employed in the rotational axis deflection detector of the present invention.
Figure 12:
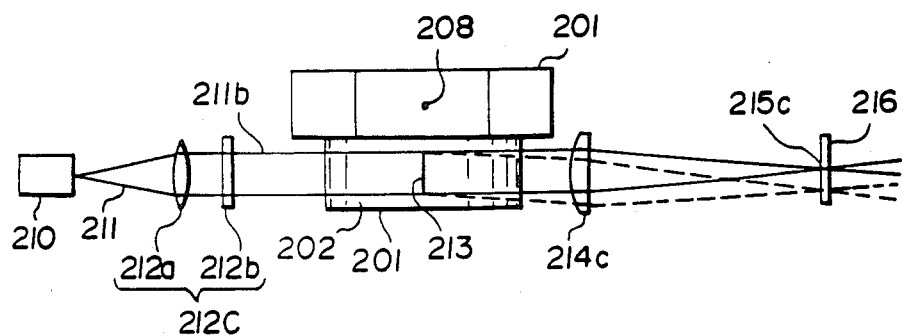
FIG. 12 is a developed side view of the optical systems shown in FIG. 11.

In the example shown in FIGS. 11 and 12, the first optical system 212C comprises a spherical lens 212a and a cylindrical lens 212b. The detection light beam 211 travels through the first optical system 212C and impinges upon the reflecting portion 213 as a strip-like light beam 211b extending in the longitudinal direction of the rotational shaft 203. The second optical system 214C comprises a single cylindrical lens which converts the light beam 211b into a strip-like light beam 215C extending transversely to the rotational shaft 203. Thus, in this example, the strip-like light beam 215C constantly extends across the position sensor 216 and deviation of the strip-like beam 215C parallel to the deflecting point-rotational axis plane is detected.

Figure 13:
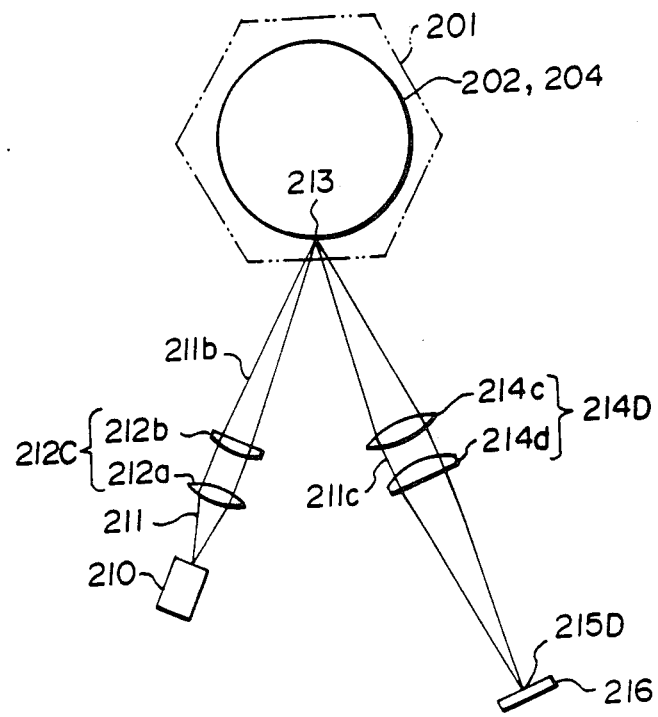
FIG. 13 is a schematic plan view showing still another combination of the first and second optical systems which can be employed in the rotational axis deflection detector of the present invention.
Figure 14:
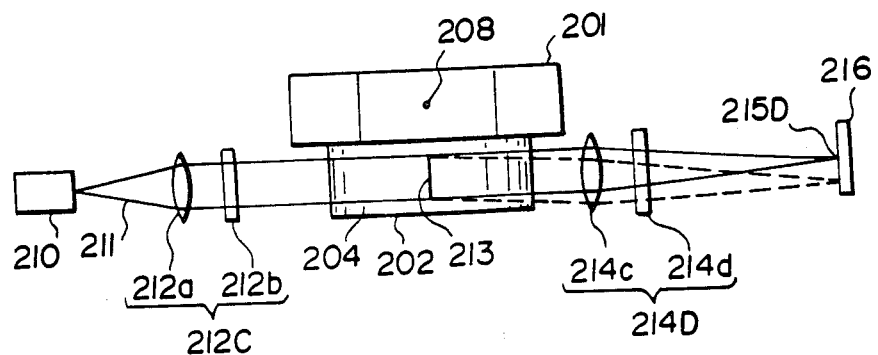
FIG. 14 is a developed side view of the optical systems shown in FIG. 13.

In the example shown in FIGS. 13 and 14, the first optical system is the same as that of the example shown in FIGS. 11 and 12, while the second optical system 214D comprises a spherical lens 214c and a cylindrical lens 214d That is, the detection light beam 211 after reflection at the reflecting portion 213 is converted by the spherical lens 214c into a light beam 211c which is parallel in plan (FIG. 13). Further, the cylindrical lens 214d focuses the light beam 211c onto a focal point of the spherical lens 214c to form a spot-like light beam 215D.

We claim:

1. A method of correcting unevenness in scanning lines in a light beam scanning apparatus having a mechanical scanning light beam deflector which rotates about a rotational axis to deflect a scanning light beam in a main scanning direction and a correcting light beam deflector for deflecting the scanning light beam in a sub-scanning direction, comprising steps of continuously detecting deflection of the rotational axis of the scanning light beam deflector to obtain nonperiodic deviation of the scanning light beam in the subscanning direction, storing the difference between a position of the scanning light beam detected at a starting point immediately before the effective scanning range and the nonperiodic deviation of the scanning light beam as a starting point deviation, storing the difference between a position of the scanning light beam detected at an end point immediately behind the effective scanning range and the nonperiodic deviation of the scanning light beam as an end point deviation, successively calculating deviation of the scanning light beam from a target scanning position in the middle of straight scanning on the basis of the stored starting point deviation, the stored end point deviation and the rotating angle of the scanning light beam deflector as periodic deviation, and determining the amount by which the scanning light beam is to be deflected in the sub-scanning direction by the correcting light beam deflector on the basis of the sum of the nonperiodic deviation and the periodic deviation.

2. A method as defined in claim 1 in which said nonperiodic deviation is calculated on the basis of the difference between the detected deflection of the rotational axis and periodic deflection of the same which is stored in advance.

3. A method as defined in claim 1 in which said periodic deviation of the scanning light beam is calculated as the value obtained by adding the starting point deviation to the product of the inclination of the scanning line calculated on the basis of the difference between the starting point deviation and the end point deviation and the distance between the starting point and the end point, and the distance between the starting point and the scanning point calculated on the basis of the rotating angle of the scanning light beam deflector.

4. A light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a reflecting surface which is substantially perpendicular to the rotational axis of the scanning light beam deflector and is rotated integrally with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, an amplifier for determining the nonperiodic deviation of the scanning light beam in the sub-scanning direction through the deflection of the rotational axis, a first position sensor which is disposed at a starting point immediatey before the effective scanning range to detect the position of the scanning light beam in the sub-scanning direction, a second position sensor which is disposed at an end point immediately behind the effective scanning range to detec the position of the scanning light beam in the sub-scanning direction, a first subtracter for calculating the difference between the output of the first position sensor and the nonperiodic deviation, a second subtracter forcalculating the difference between the output of the second position sensor and the nonperiodic deviation, a first memory for storing the output of the first subtracter as a starting point deviation, a second memory for storing the output of the second subtracter as an end point deviation, an operator for successively calculating deviation of the scanning light beam from a target scanning position in the middle of straight scanning on the basis of the stored starting point deviation, the stored end point deviation and the rotating angle of the scanning light beam deflector and outputting it as periodic deviation, an adder for calculating the sum of the periodic deviation and the nonperiodic deviation, and a driving circuit for driving the correcting light beam deflector on the basis of the sum to cancel unevenness in the scanning lines.

5. A light beam scanning apparatus as defined in claim 4 in which said scanning light beam deflector is a rotating polygonal mirror.

6. A light beam scanning apparatus as defined in claim 5 in which said reflecting surface is provided on one end face of the rotating polygonal mirror.

7. A light beam scanning apparatus as defined in claim 4 in which said correcting light beam deflector comprises an acoustooptic modulator.

8. A light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a revolution surface mirror having a reflecting surface which is a surface of revolution coaxial with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, an amplifier for determining the nonperiodic deviation of the scanning light beam in the subscanning direction through the deflection of the rotational axis, a first position sensor which is disposed at a starting point immediately before the effective scanning range to detect the position of the scanning light beam in the subscanning direction, a second position sensor which is disposed at an end point immediately behind the effective scanning range to detect the position of the scanning light beam in the sub-scanning direction, a first subtracter for calculating the difference between the output of the first position sensor and the nonperiodic deviation, a second subtracter for calculating the difference between the output of the second position sensor and the nonperiodic deviation, a first memory for storing the output of the first subtracter as a starting point deviation, a second memory for storing the output of the second subtracter as an end point deviation, an operator for successively calculating deviation of the scanning light beam from a target scanning position in the middle of straight scanning on the basis of the stored starting point deviation, the stored end point deviation and the rotating angle of the scanning light beam deflector and outputting it as periodic deviation, an adder for calculating the sum of the periodic deviation and the nonperiodic deviation, and a driving circuit for driving the correcting light beam deflector on the basis of the sum to cancel unevenness in the scanning lines.

9. A light beam scanning apparatus as defined in claim 8 in which said scanning light beam deflector is a rotating polygonal mirror.

10. A light beam scanning apparatus as defined in claim 9 in which said revolution surface mirror is formed integrally with the rotating polygonal mirror.

11. A light beam scanning apparatus as defined in claim 9 in which said correcting light beam deflector comprises an acoustooptic modulator.

12. A method of correcting unevenness in scanning lines in a light beam scanning apparatus having a mechanical scanning light beam deflector which rotates about a rotational axis to deflect a scanning light beam in a main scanning direction and a correcting light beam deflector for deflecting the scanning light beam in a sub-scanning direction, comprising steps of storing in advance the periodic deviation of the scanning light beam in the sub-scanning direction in connection with the rotating angle of the scanning light beam deflector for each deflecting surface thereof, storing in advance the periodic deflection of the rotational axis of the scanning light beam deflector in connection with the rotating angle of the scanning light beam deflector, successively calculating nonperiodic deflection of the rotational axis on the basis of the difference between continuously detected deflection of the rotational axis and the periodic deflection of the rotational axis for the corresponding rotating angle of the scanning light beam deflector, and determining the amount by which the scanning light beam is to be deflected in the sub-scanning direction by the correcting light beam deflector on the basis of the sum of the nonperiodic deviation of the scanning light beam calculated through the nonperiodic deflection of the rotational axis and the periodic deviation stored in advance.

13. A light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a reflecting surface which is substantially perpendicular to the rotational axis of the scanning light beam deflector and is rotated integrally with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, a first memory in which is stored in advance the periodic deviation of the scanning light beam in the sub-scanning direction in connection with the rotating angle of the scanning light beam deflector for each deflecting surface thereof, a second memory in which is stored in advance periodic deflection of the rotational axis of the scanning light beam deflector in connection with the rotating angle of the scanning light beam deflector, a subtracter for successively calculating nonperiodic deflection of the rotational axis on the basis of the difference between continuously detected deflection of the rotational axis and the periodic deflection of the rotational axis for the corresponding rotating angle of the scanning light beam deflector, an operator for calculating the nonperiodic deviation of the scanning light beam on the basis of the nonperiodic deflection of the rotational axis, an adder for calculating the sum of the periodic deviation stored in the first memory and the nonperiodic deviation, and a driving circuit for driving the correcting light bean deflector on the basis of the sum to cancel unevenness in the scanning lines.

14. A light beam scanning apparatus as defined in claim 13 in which said scanning light beam deflector is a rotating polygonal mirror.

15. A light beam scanning apparatus as defined in claim 14 in which said reflecting surface is provided on one end face of the rotating polygonal mirror.

16. A light beam scanning apparatus as defined in claim 15 is which said correcting light beam deflector comprises an acoustooptic modulator.

17. A light beam scanning apparatus comprising a mechanical scanning light beam deflector which rotates about a rotational axis to deflect a scanning light beam in a main scanning direction, a correcting light beam deflector for deflecting the scanning light beam in a sub-scanning direction, a revolution surface mirror having a reflecting surface which is a surface of revolution coaxial with the scanning light beam deflector, a detection light beam source for emitting a detection light beam to impinge upon the reflecting surface, a rotational axis deflection detector for detecting the deflection of the rotational axis through the deviation of the detection light beam reflected by the reflecting surface, a first memory in which is stored in advance the periodic deviation of the scanning light beam in the sub-scanning direction in connection with the rotating angle of the scanning light beam deflector for each deflecting surface thereof, a second memory in which is stored in advance periodic deflection of the rotational axis of the scanning light beam deflector in connection with the rotating angle of the scanning light beam deflector, a subtracter for successively calculating nonperiodic deflection of the rotational axis on the basis of the difference between continuously detected deflection of the rotational axis and the periodic deflection of the rotational axis for the corresponding rotating angle of the scanning light beam deflector, an operator for calculating the nonperiodic deviation of the scanning light beam on the basis of the nonperiodic deflection of the rotational axis, an adder for calculating the sum of the periodic deviation stored in the first memory and the nonperiodic deviation, and a driving circuit for driving the correcting light bean deflector on the basis of the sum to cancel unevenness in the scanning lines.

18. A light beam scanning apparatus as defined in claim 17 in which said scanning light beam deflector is a rotating polygonal mirror.

19. A light beam scanning apparatus as defined in claim 17 in which said revolution surface mirror is formed integrally with the rotating polygonal mirror.

20. A light beam scanning apparatus as defined in claim 17 in which said correcting light beam deflector comprises an acoustooptic modulator.

21. A method of detecting deflection of a rotational axis of a mechanical light beam deflection which rotates about the rotational axis to deflect a scanning light beam in a light beam scanning apparatus, comprising the steps of providing a revolution surface mirror having a reflecting surface which is a surface of revolution coaxial with the light beam deflector, causing a detection light beam diverging at least with respect to the longitudinal direction of the rotational axis to impinge upon the reflecting surface to be reflected thereby, focusing the reflected detection light beam on a detecting surface having a position sensor and detecting the deflection of the rotational axis on the basis of the component of the deviation of the focused light beam on the detecting surface parallel to a deflecting point-rotational axis plane which is the plane including the rotational axis of the light beam deflector and the deflecting point on the deflector at which the scanning light beam is deflected. thereby, focusing the reflected detection light beam on a detecting surface having a position sensor and detecting the deflection of the rotational axis on the basis of the component of the deviation of the focused light beam on the detecting surface parallel to the deflecting point-rotational axis plane which is the plane including the rotational axis of the light beam deflector and the deflecting point on the deflector at which the scanning light beam is eeflected.

22. A method as defined in claim 21 in which said detection light beam is caused to impinge upon the reflecting surface of the revolution surface mirror substantially on the intersection of the reflecting surface and the deflecting point-rotational axis plane.

23. A method as defined in claim 21 or 22 in which said detection light beam is obtained by dividing the scanning light beam by a beam splitter.

24. A rotational axis deflection detecting device for detecting deflection of a rotational axis of a mechanical light beam deflector which rotates about the rotational axis to deflect a scanning light beam in a light beam scanning apparatus, comprising a revolution surface mirror having a reflecting survace which is a surface of revolution coaxial with the light beam deflector, a detection light beam source for emitting a detection light beam, a first optical system for causing the detection light beam to impinge upon the reflecting surface of the revolution surface mirror in the form of a light beam diverging at least with respect to the longitudinal direction of the rotational axis, a second optical system for focusing the detection light beam reflected by the reflecting surface on a detecting surface as a focused light beam, and a position sensor for detecting the component of the deviation of the focused light beam on the detecting surface parallel to a deflecting point-rotational axis plane which is the plane including the rotational axis of the light beam deflector and the deflecting point on the deflector at which the scanning light beam is deflected.

25. A rotational axis deflection detecting device as defined in claim 24 in which said detection light beam is reflected by the reflecting surface of the revolution surface mirror at a portion disposed substantially on the intersection of the reflecting surface and the deflecting point-rotational axis plane.

26. A rotational axis deflection detecting device as defined in claim 24 or 25 in which said light beam deflector comprises a rotating polygonal mirror and said revolution surface mirror is formed on one end of the rotating polygonal mirror integrally therewith.

27. A rotational axis deflection detecting device as defined in claim 24 or 25 in which the first optical system comprises a spherical lens for converting the detection light beam emitted from the light source into a coherent light beam.

28. A rotational axis deflection detecting device as defined in claim 27 in which the second optical system comprises a pair of cylindrical lenses for converting the detection light beam reflected by the reflecting surface into a spot-like focused beam.

29. A rotational axis deflection detecting device as defined in claim 27 in which the second optical system comprises a cylindrical lens which converts the detection light beam reflected by the reflecting surface into a striplike beam substantially perpendicular to the rotational axis.

30. A rotational axis deflection detecting device as defined in claim 24 or 25 in which the first optical system comprises a spherical lens and a cylindrical lens which causes the detection light beam to impinge upon the reflecting portion as a strip-like light beam extending in the longitudinal direction of the rotational axis.

31. A rotational axis deflection detecting device as defined in claim 30 in which the second optical system comprises a cylindrical lens which converts the detection light beam reflected by the reflecting surface into a striplike light beam extending substantially transversely to the rotational axis.

32. A rotational axis deflection detecting device as defined in claim 30 in which the second optical system comprises a spherical lens and a cylindrical lens for converting the detection light beam after reflection by the reflecting surface into a spot-like focused light beam.

33. A rotational axis deflection detecting device as defined in claim 24 or 25 in which said position sensor comprises a semiconductor position sensitive detector.

34. A method of detecting deflection of a rotational axis of a light beam deflecting surface which rotates about the rotational axis to deflect a scanning light beam from a deflecting point (a) on the deflecting surface in a light beam scanning apparatus, comprising the steps of providing a reflecting surface which is substantially perpendicular to the rotational axis and is rotated integrally with the light beam deflecting surface, causing a detection light beam diverging in the direction of a line passing through the deflection point and perpendicular to the rotational axis to impinge upon the reflecting surface to be reflected thereby, forcusing the reflected detection light beam on a detecting surface having a position sensor, and detecting the deflection of the rotational axis on the basis of the component of the deviation of the focused light beam on the detecting surface in the direction of an orthographic projection of said line onto the detecting surface.

35. A method of defined in claim 34 in which said detection light beam is obtained by dividing the scanning light beam by a beam splitter.

* * * * *